Reissued Sept. 4, 1934

Re. 19,307

UNITED STATES PATENT OFFICE 19,307

TREATMENT OF CHINA WOOD OIL TO PRODUCE A LIQUID UNGELLED OIL AND PRODUCT THEREOF

Floyd M. Reece, South Bend, Ind., assignor to O'Brien Varnish Company, South Bend, Ind., a corporation of Indiana No Drawing. Original No. 1,903,686, dated April 11, 1933, Serial No. 486,865, October 6, 1930. Application for reissue July 19, 1934, Serial No. 736,109

6 Claims. (Cl. 87—12)

This invention relates to the treatment of China-wood oil, sometimes known as "tung oil", for the purpose of rendering it especially adaptable for use as a drying or base oil in the manufacture of varnishes and/or a plasticizer for lacquers, for example, the pyroxylin lacquers.

The oil with which the present invention is concerned is that oil which is expressed from the berries or seeds of the tree "*Aleurites cordata*", and is known in the art as China-wood oil or "tung oil".

In prior practice the oil is prepared for use in paints or varnishes by a heat treatment, in which it is heated with natural resins or resin acids, the resulting product being admixed with natural or synthetic varnish resins or gums in the preparation of varnishes, paints and the like. The resin is first thoroughly melted and the heat treated wood oil is admixed therewith while heated, in predetermined proportions. The wood-oil and resin mixture is subjected to further heating until the oil and resin are so combined that they will not separate upon cooling. A suitable thinning medium such as turpentine, petroleum-thinner (or both) is then added to the mixture (preferably while it is still warm) to reduce it to the desired consistency. Ordinarily a suitable drier is added with the thinner, or it may be added after the thinned mixture is cooled. Such driers are ordinarily compounds of lead and manganese. It is often the practice to employ a mixture of heat treated linseed oil and heat treated wood oil as a varnish base instead of wood oil alone.

In the preparatory heat treatment of China-wood oil, as hitherto practiced, the oil is heated in the presence of a natural resin or resin-acid in large kettles or pots to temperatures of 500 to 550 or as high as 565° F. for substantial periods of time. In the heat treatment, higher temperatures are avoided, and the use of resins or resin-acids is necessary since otherwise the oil rapidly polymerizes to a solid mass or gel which is useless in the preparation of paints and varnishes.

It is well known in prior practice that when a batch of wood oil is so treated great care must be exercised and if a substantial quantity of gas begins to be evolved some resin or an acid compound is immediately added to the hot oil to control the heating operation and retard the heat-induced reaction. This control is important because if the reaction proceeds too rapidly, or too far, the finished varnish product made with the oil will be dull or smoky and will form a checked or cracked coating upon its application as a varnish.

I have found that China-wood oil may be brought to a temperature of 600° F. or higher by a heating operation conducted with such rapidity that the formation of a gel or solid mass is not permitted while the oil is passing through the temperature range (say from 550° to 600° F.) in which such polymerization and gel formation ordinarily takes place; and I have further found that when the oil is heated in such manner to temperatures above 600° F. and preferably to 650° F. or higher, oil products are secured having novel and distinctive properties. These oil products range from drying oils having novel and distinctive characteristics as base oils for paints and varnishes to non-drying oils highly effective as plasticizers in cellulose ester lacquers.

The drying oil products prepared in accordance with my invention distinguish from natural wood oil markedly in their characteristics and behavior. They are particularly advantageous, in comparison with prior wood oil products in that they dry to a clear, lustrous film, free from gas-checking, without the addition of natural resins or resin-acids, and hence may be employed with neutral resins and artificial resins in the production of coating compositions. They likewise distinguish in behavior from natural China-wood oil and the products thereof hitherto known in requiring the use of markedly smaller proportions of driers and in the greater durability and resistance of the resulting film.

The non-drying oils produced in accordance with my invention are clearly different from tung oil and products thereof hitherto known in their lack of drying properties. They are highly effective as plasticizers in cellulose ester lacquers and produce therein a remarkable degree of adhesion to the base surface, and particularly to metallic surfaces.

If China-wood oil is heated alone to temperatures of 500° F. and higher, without added substances present, a reaction takes place, which is probably a polymerization, and a gum or gel-like mass is formed. The rate of speed with which this gum or gel formation takes place increases at higher temperatures.

I have found that if such oil is heated with a sufficiently rapid rate of heat input, it may be brought to a temperature above 600° F., and preferably above 650° F. without such gum or gel formation taking place.

At such higher temperatures, say from 600° F. and preferably from 650° F. to temperatures of Sept. 4, 1934. C. WILHJELM Re. 19,308
VALVE REGULATING DEVICE
Original Filed March 16, 1929 2 Sheets-Sheet 1
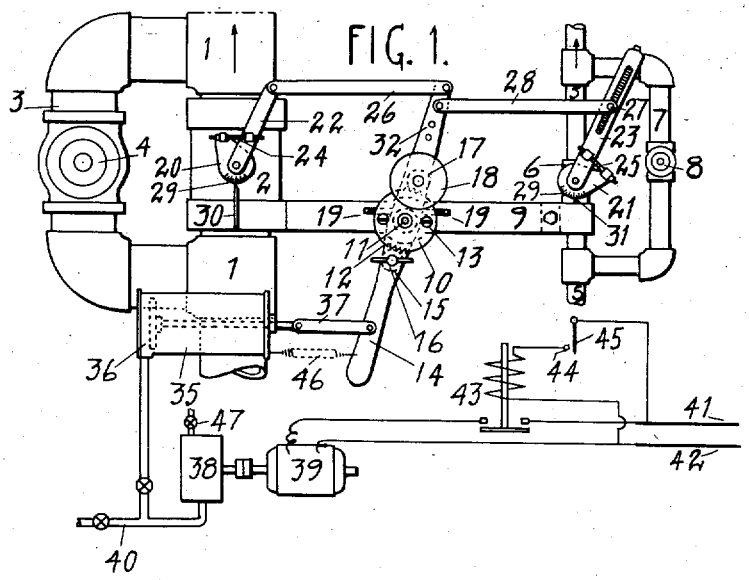
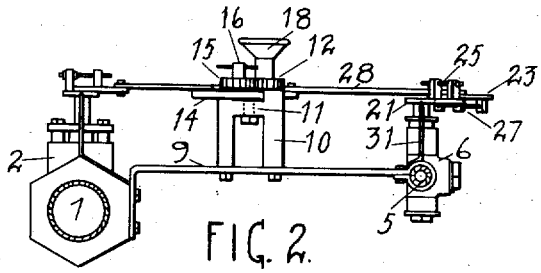
INVENTOR.
Christian Wilhjelm
BY
Frank H. Borden
ATTORNEY.